United States Patent Office 2,759,008
Patented Aug. 14, 1956

2,759,008

HIGH PRESSURE POLYMERIZATION OF ALKYL-CYCLOSILOXANES IN THE PRESENCE OF AN ACID CATALYST

Milton L. Dunham, Jr., Kenmore, and George H. Wagner, Clarence, N. Y., assignors to Union Carbide and Carbon Corporation, a corporation of New York No Drawing. Application June 10, 1953,
Serial No. 360,833

11 Claims. (Cl. 260—448.2)

This invention relates to organosiloxane polymers and to a process for the preparation thereof. More particularly, the invention relates to an improved process for preparing alkylsiloxane polymers by the polymerization of alkylcyclosiloxanes.

Alkylcyclosiloxanes are cyclic compounds which contain alternate silicon and oxygen atoms and which have the formula $(RR'SiO)_x$ where R is an alkyl radical, R' is taken from the group consisting of hydrogen and an alkyl radical, and $x$ is an integer of from 3 to 8 and possibly higher. These compounds are generally prepared by the hydrolysis and condensation of alkylsilanes containing two hydrolyzable groups bonded to the silicon atom thereof.

It is well known that certain of the alkylcyclosiloxanes may be polymerized to high molecular weight alkylsiloxane polymers by treatment with a catalyst and, as is required in particular instances, with the aid of heat. The dialkylcyclosiloxanes polymerize to dialkylsiloxane polymers while the monoalkylsiloxanes of the formula $(RSiHO)_x$ polymerize to monoalkylsiloxane polymers of the formula $—(RSiHO)_y—$ where $y$ is an integer greater than $x$.

It is also well known that the molecular weight of the various polymer chains prepared by the above processes, may be readily controlled by the addition of appropriate amounts of chain terminators or endblocking compounds which normally comprise silicon-containing compounds having only one functional group bonded to one silicon atom thereof. The other groups bonded to the silicon atom or atoms of the compound are non-functional, that is, they do not readily react with the terminal groups of the siloxane polymer chain. Such chain endblocking compounds react with terminal groups of a polymer chain through their single functional group and upon so doing, limit further growth of such chains. In this manner, the molecular weight of the siloxane polymers and consequently the viscosity of the product may be readily controlled so as to prepare fluids varying from light oils to greases. Such endblocked polymers are widely employed as lubricants, plasticizers, additives, or as coatings for numerous purposes.

In the above mentioned method for preparing cyclosiloxanes, the hydrolysis and condensation process yields for the most part, a mixture of various cyclosiloxanes. For example, there may be present in such condensate, alkylsiloxanes having 3, 4, 5 or more of the following units

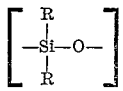

which comprise the ring compound. It is well known that certain of such cyclic siloxanes for example, octamethylcyclotetrasiloxane, may be polymerized if treated with a catalyst under normal conditions. However, it is equally well known that other cyclic siloxanes which are normally prepared in the hydrolysis and condensation process, for example, octaethylcyclotetrasiloxane, are either difficult to polymerize or non-polymerizable under known conditions. Thus, a condensate containing both polymerizable and non-polymerizable cyclic siloxanes, will, after being subjected to the usual conditions of polymerization, comprise polymers of the polymerizable cyclic siloxanes and those non-polymerized cyclic siloxanes.

In numerous applications of alkylsiloxane polymers, the presence of non-polymerized cyclic siloxanes in the product is undesirable as they tend to lower the viscosity thereof. Moreover, should the product be employed under conditions requiring the use of elevated temperatures, these non-polymerized cyclic compounds are volatilized. It is therefore necessary in many instances to strip or distill the non-polymerized cyclic compounds from the polymerizate before use.

Heretofore, considerable effort has been directed toward finding new or improved methods for polymerizing various alkylsiloxanes prepared by the hydrolysis and condensation process. The use of the new catalysts and of particular modifications in the known polymerization processes has been proposed. However, such methods have not proven entirely satisfactory. In view of this difficulty, the condensed hydrolyzate is oftentimes treated before polymerization by various methods to remove the nonpolymerizable alkylcyclosiloxanes. Such methods are, of course, time-consuming and undesirable.

We have found that alkylcyclosiloxanes may be polymerized to alkylsiloxane polymers by a process which comprises treating such cyclosiloxanes with an acid catalyst at a pressure of at least 1500 pounds per square inch. Our invention makes possible the polymerization of alkylcyclosiloxanes in greatly reduced periods of time and causes the polymerization reaction to be driven toward completion thus resulting in yields not heretofore obtained. Moreover, the invention provides an effective means for polymerizing condensed alkylsilane hydrolyzates normally comprising a mixture of various alkylcyclosiloxanes to polymeric products.

The catalysts employed as indicated above are acid catalysts. Such catalysts if employed according to the conditions disclosed in the prior art, are known to cause polymerization of the polymerizable alkylcyclosiloxanes to alkylsiloxane polymers. These acid catalysts include sulfuric acid, chlorosulfonic acid, phosphoric acid, phosphorous pentoxide, fluorophosphoric acid, antimony pentachloride, boric acid, and the Lewis type acids such as boron trifluoride and aluminum trichloride.

The above catalysts are normally employed in varying amounts depending upon the particular type of acid catalyst used. Those acids which contain water will be employed in amounts depending upon the concentration thereof. Thus a concentrated acid such as a 96% sulfuric acid is employed in an amount of from about 0.1% to about 10% by weight of the cyclosiloxane being polymerized. Of course if the concentration of the acid is less, larger amounts of the catalyst will be employed. Other acid catalysts which do not contain water, such as the Lewis type acids, are usually employed in amounts varying from 0.1 to 10% by weight of the cyclic siloxane.

In the practice of our invention, pressures of at least 1500 pounds per square inch are required. We prefer to employ pressures which vary from 15,000 to about 100,000 pounds per square inch. The process of our invention may be conducted under static conditions by charging a reactor to maximum capacity with the cyclosiloxane being polymerized, sealing and applying pressure hydrostatically by heating the charge. In this type of operation, it is necessary to provide the reactor with an automatic back pressure valve to vent some of the charge in the event that pressures which may damage the system are being approached. It is also possible to conduct static operation of the process by charging the cyclosiloxane to an open reactor and applying pressure upon the charge through the open end of the reactor by means of a hydraulic press or a high pressure fluid intensifier. The hydraulic intensifier is a piston type pump and may be operated to exert high pressures by the application of a moderate pressure to the low pressure end thereof.

Our invention may also be conducted under continuous flow conditions in suitable continuous flow apparatus designed to withstand the pressure required. We prefer to employ a heavy walled tube type reactor so that positive flow through the reaction zone is maintained. The pressure may be applied to the system by means of a high pressure plunger-type pump operated by mechanical means or it may be applied by means of the hydraulic intensifier pump which has the obvious advantage of automatic pressure control.

The following examples, wherein a representative acid catalyst, sulfuric acid, was employed, will more clearly illustrate our invention. In the examples below the extent of polymerization obtained is referred to in terms of the relative viscosity of the product. A product identified as being slightly viscous will have an approximate viscosity at 25° C. of from about 1000 to about 2000 centipoises; a viscous product will have an approximate viscosity at 25° C. of from about 2000 to about 10,000 centipoises; a very viscous product will have an approximate viscosity at 25° C. of from about 10,000 to about 50,000 centipoises, and an extremely viscous product will have a viscosity of above 50,000 centipoises at 25° C.

In general the process of our invention will be conducted at a temperature ranging from 0° C. to 60° C.

EXAMPLE I

Approximately 20 cc. of hexaethylcyclotrisiloxane obtained by the vacuum fractionation from the crude hydrolyzate of ethyldichlorosilane was charged with 2.3% by weight of hexaethylcyclotrisiloxane of sulfuric acid (96% conc.) to a soft lead capsule equipped with a tapered plug seal. The insertion of the tapered plug served to force out a few drops of the charge thereby insuring a completely full capsule. The capsule was then positioned within a heavy walled heat treated alloy steel cylinder equipped with a supporting internal plug at one end thereof. A steel plug was inserted in the opening of the cylinder and rested upon the capsule and served to transmit force applied from a hydraulic press to the capsule, thus developing pressure upon the charge. The charge was compressed at a pressure of 50,000 pounds per square inch for a period of 2¼ hours. Pressure was then released and the capsules withdrawn and emptied. An extremely viscous diethylsiloxane polymer was obtained.

EXAMPLE II

Employing the identical procedure disclosed in Example I, a charge comprising 20 cc. of octaethylcyclotetrasiloxane and 7.8% by weight of octaethylcyclotetrasiloxane of sulfuric acid (96% conc.) was compressed at a pressure of 50,000 pounds per square inch for a period of 2 hours. A very viscous diethylsiloxane polymer was obtained.

EXAMPLE III

A charge comprising 20 cc. of octamethylcyclotetrasiloxane and 2.5% by weight of octamethylcyclotetrasiloxane of sulfuric acid (96% conc.) was compressed at a pressure of 50,000 pounds per square inch for a period of 2¼ hours. The procedure followed was identical to that disclosed in Example I. A slightly viscous dimethylsiloxane polymer was obtained.

EXAMPLE IV

To disclose the particularly advantageous benefits of our invention, we polymerized various alkylcyclosiloxanes at atmospheric pressure and at a pressure in excess of 1500 pounds per square inch. In all reactions, a sulfuric acid catalyst (96% conc.) was employed. The following table contains the data obtained from the various polymerization reactions. The polymerizations conducted under pressures within the scope of the invention were carried out under the conditions disclosed in Example I, while those conducted without the benefit of such pressures were carried out with identical equipment; however, a pressure of about 1000 pounds per square inch were employed to insure closure of the capsule and to prevent evaporation of the compounds.

*Table*

COMPARATIVE POLYMERIZATIONS OF ALKYLCYCLOSILOXANES

| Cyclosiloxanes | Pressure, pounds per square inch | Temp. (° C.) | Time (hr.) | Amount of catalyst, percent by weight of cyclosiloxane | Product viscosity (centistokes) |
|---|---|---|---|---|---|
| Hexaethylcyclotrisiloxane | 50,000 | 25 | 2¼ | 2.3 | Extremely viscous. |
| Do | 1,000 | 25 | 2¼ | 2.3 | Little change. |
| Do | 1,000 | 25 | 64 | 2.3 | Extremely viscous. |
| Octaethylcyclotetrasiloxane | 50,000 | 25 | 18 | 7.8 | Do. |
| Do | 50,000 | 25 | 2 | 7.8 | Very viscous. |
| Do | 1,000 | 25 | 40 | 8.3 | Slightly viscous. |

As may be seen from the above table, the use of pressures in excess of 15,000 pounds per square inch causes polymerization of cyclosiloxanes to alkylsiloxane polymers in greatly reduced periods of time. Specifically hexaethylcyclotrisiloxane may be polymerized to an extremely viscous polymer in a period of 2¼ hours when employing a pressure of 50,000 pounds per square inch, whereas a period of 64 hours is required to obtain a product of comparable viscosity without the use of pressure. In addition it is also seen that octaethylcyclotetrasiloxane is extremely difficult to polymerize by employing sulfuric acid, requiring 40 hours to obtain a slightly viscous product. On the other hand, when pressures of 50,000 pounds per square inch are employed, a very viscous product is obtained after only 2 hours of reaction time and an extremely viscous product is obtained after 18 hours of reaction time.

The process of our invention may be effectively employed to polymerize all alkylcyclosiloxanes. Thus, for example, we may employ an acid catalyst and a pressure of at least 1500 pounds per square inch to polymerize such cyclic siloxanes as hexamethylcyclotrisiloxanes, octamethylcyclotetrasiloxane, decatethylcyclopentasiloxane, dodecaethylcyclohexasiloxane and tetradecaethylcycloheptasiloxane. The process of our invention may also be employed to polymerize a crude hydrolyzate containing mixtures of various cyclosiloxanes. Thus the need for obtaining a pure cyclic siloxane for purposes of polymerization, as is oftentimes required by the processes of the prior art, is not necessary.

We claim:

1. A process for preparing an alkylsiloxane polymer which comprises treating an alkylcyclosiloxane having the formula $(RR'SiO)_x$ where R is an alkyl radical, R' is taken from the group consisting of hydrogen and an alkyl radical and $x$ is an integer of from 3 to 8, with an acid catalyst under a pressure of at least 1500 pounds per square inch and recovering an alkylsiloxane polymer.

2. A process for preparing a dialkylsiloxane polymer which comprises treating an alkylcyclosiloxane, having the formula $(R_2SiO)_x$ where R is an alkyl radical and $x$ is an integer of from 3 to 8, with an acid catalyst under a pressure of at least 1500 pounds per square inch and recovering a dialkylsiloxane polymer.

3. A process for preparing a diethylsiloxane polymer which comprises treating hexaethylcyclotrisiloxane with an acid catalyst under a pressure of at least 1500 pounds per square inch and recovering a diethylsiloxane polymer.

4. A process for preparing a diethylsiloxane polymer which comprises treating an octaethylcyclotetrasiloxane with an acid catalyst under a pressure of at least 1500 pounds per square inch and recovering a diethylsiloxane polymer.

5. A process for preparing an alkylsiloxane polymer which comprises treating an alkylcyclosiloxane, having the formula $(RR'SiO)_x$ where R is an alkyl radical, R' is taken from the group consisting of hydrogen and an alkyl radical and $x$ is an integer of from 3 to 8, with sulphuric acid under a pressure of from about 15,000 to about 100,000 pounds per square inch and recovering an alkylsiloxane polymer.

6. A process for preparing a dialkylsiloxane polymer which comprises treating an alkylcyclosiloxane, having the formula $(R_2SiO)_x$ where R is an alkyl radical and $x$ is an integer of from 3 to 8, with sulphuric acid under a pressure of from about 15,000 to about 100,000 pounds per square inch and recovering a dialkylsiloxane polymer.

7. A process for preparing an alkylsiloxane polymer which comprises treating an alkylcyclosiloxane, having the formula $(RR'SiO)_x$ where R is an alkyl radical, R' is taken from the group consisting of hydrogen and an alkyl radical and $x$ is an integer of from 3 to 8, with an acid catalyst under a pressure of from about 15,000 to about 100,000 pounds per square inch and recovering an alkylsiloxane polymer.

8. A process for preparing a dialkylsiloxane polymer which comprises treating an alkylcyclosiloxane, having the formula $(R_2SiO)_x$ where R is an alkyl radical and $x$ is an integer of from 3 to 8, with an acid catalyst under a pressure of from 15,000 to about 100,000 pounds per square inch and recovering a dialkylsiloxane polymer.

9. A process for preparing a diethylsiloxane polymer which comprises treating hexaethylcyclotrisiloxane with sulphuric acid under a pressure of at least 1500 pounds per square inch and recovering a diethylsiloxane polymer.

10. A process for preparing a diethylsiloxane polymer which comprises treating octaethylcyclotetrasiloxane with sulphuric acid under a pressure of at least 1500 pounds per square inch and recovering a diethylsiloxane polymer.

11. A process for preparing an alkylsiloxane polymer which comprises treating an alkylcyclosiloxane, having the formula $(RR'SiO)_x$ where R is an alkyl radical, R' is taken from the group consisting of hydrogen and an alkyl radical and $x$ is an integer of from 3 to 8, with an acid catalyst at a temperature of from about 0° C. to about 60° C. under a pressure of at least 1500 pounds per square inch and recovering an alkylsiloxane polymer.

References Cited in the file of this patent

UNITED STATES PATENTS

| | | |
|---|---|---|
| 2,469,888 | Patnode | May 10, 1949 |
| 2,534,149 | Sauer | Dec. 12, 1950 |
| 2,550,003 | Daudt | Apr. 24, 1951 |

OTHER REFERENCES

Scott: Jour. Am. Chem. Soc., vol. 68 (1946), pages 358–363.